(12) United States Patent
Idemura et al.

(10) Patent No.: US 8,349,922 B2
(45) Date of Patent: Jan. 8, 2013

(54) PIGMENT DISPERSION, WATER-BASED PIGMENT DISPERSION LIQUID, AND INKJET RECORDING INK AND METHOD FOR PRODUCING WATER-BASED PIGMENT DISPERSION LIQUID

(75) Inventors: Satoshi Idemura, Saitama (JP); Hiroshi Maru, Sakura (JP); Kenji Sugo, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/421,493

(22) Filed: Mar. 15, 2012

(65) Prior Publication Data

US 2012/0232199 A1 Sep. 13, 2012

Related U.S. Application Data

(63) Continuation of application No. PCT/JP2010/065796, filed on Sep. 14, 2010.

(30) Foreign Application Priority Data

Sep. 16, 2009 (JP) ................ 2009-214370

(51) Int. Cl.
*C09D 11/00* (2006.01)
*C09D 133/02* (2006.01)

(52) U.S. Cl. .............. 524/81; 524/88; 524/90; 524/556; 524/430; 524/92; 524/102

(58) Field of Classification Search .......... 524/88, 524/90, 556, 430, 81, 87, 92, 102; 106/31.77
See application file for complete search history.

(56) References Cited

U.S. PATENT DOCUMENTS

| 2005/0054751 A1 | 3/2005 | Namba et al. |
| 2007/0037900 A1 | 2/2007 | Harada et al. |
| 2008/0139706 A1* | 6/2008 | Kaji et al. ................ 524/88 |
| 2009/0326118 A1 | 12/2009 | Inoue et al. |

FOREIGN PATENT DOCUMENTS

| JP | 2003-96354 A | | 4/2003 |
| JP | 2003-335987 A | | 11/2003 |
| JP | 2004-212451 A | * | 7/2004 |
| JP | 2005-60419 A | | 3/2005 |
| JP | 2006-96777 A | | 4/2006 |
| JP | 2007-254735 A | | 10/2007 |
| WO | 2008/015998 A1 | | 2/2008 |

OTHER PUBLICATIONS

International Search Report of PCT/JP2010/065796, mailing date of Sep. 30, 2010.

* cited by examiner

*Primary Examiner* — Robert D. Harlan
(74) *Attorney, Agent, or Firm* — Westerman, Hattori, Daniels & Adrian, LLP

(57) ABSTRACT

A yellow water-based pigment dispersion liquid is provided that includes pigment particles dispersed with a significantly small particle size, that has excellent dispersion stability, that causes less precipitation even at low viscosity, and that provides high gloss when the dispersion liquid is used as a main component of inkjet recording ink. In order to produce the water-based pigment dispersion liquid, it is important to add, as a kneading aid, an acetylene glycol surfactant having a specific structure and an HLB value of 8 to 12 to a mixture containing a bis-acetoacetallylide pigment, a styrene-acrylic acid copolymer having an acid value of 145 to 175, a basic compound, and a humectant and then to knead the resultant mixture to obtain a pigment dispersion. By dispersing the pigment dispersion in a water-based medium, a water-based pigment dispersion liquid for inkjet recording having the characteristics above can be produced.

18 Claims, No Drawings ing ink and a method for producing the water-based pigment dispersion liquid, and an inkjet recording ink containing the water-based pigment dispersion liquid as a main component.

PIGMENT DISPERSION, WATER-BASED PIGMENT DISPERSION LIQUID, AND INKJET RECORDING INK AND METHOD FOR PRODUCING WATER-BASED PIGMENT DISPERSION LIQUID

TECHNICAL FIELD

The present invention relates to a pigment dispersion using a yellow pigment for ink, a water-based pigment dispersion liquid obtained by dispersing the pigment dispersion in a water-based medium and a method for producing the water-based pigment dispersion liquid, and an inkjet recording ink containing the water-based pigment dispersion liquid as a main component.

BACKGROUND OF THE INVENTION

Water-based ink can reduce the risk of fire and the toxicity such as mutagenicity, which are problems of oil-based ink. Therefore, water-based ink has been widely used in inkjet recording applications other than industrial applications.

A water-based inkjet recording ink that uses a pigment has an advantage of providing excellent light resistance. However, if the pigment is not sufficiently pulverized, droplets cannot be stably discharged and the gloss of images to be formed is not improved. It is also difficult to stably hold pulverized pigment particles, which poses a large problem such as clogging of nozzles caused by aggregation and precipitation of the pigment. The precipitation due to the aggregation of the pigment poses a serious problem in that the yield and quality are decreased in the production process of a water-based pigment dispersion liquid, which is an intermediate of ink.

To address such problems, a method in which a pigment is dispersed in a water-based medium using a polymeric dispersant has been investigated. However, in general, it is difficult to disperse a pigment using only a polymeric dispersant so that pigment particles have a small particle size and to stably hold the dispersion of the pigment for a long time. In particular, there are not many yellow pigments having excellent light resistance. Thus, it is difficult to produce a water-based pigment dispersion liquid and a water-based inkjet recording ink that have excellent light resistance, dispersibility, and dispersion stability by using limited types of pigments.

A water-based pigment dispersion liquid containing Pigment Yellow 155, which is a bis-acetoacetallylide pigment, dispersed using a styrene-acrylic acid copolymer as a dispersant is known. See Japanese Unexamined Patent Application Publication No. 2005-060419.

The water-based pigment dispersion liquid produced in Japanese Unexamined Patent Application No. 2005-060419 has excellent color development and light resistance, which are strong points of Pigment Yellow 155. However, when the water-based pigment dispersion liquid is used for an inkjet ink that needs to have good jettability and low viscosity, the pigment is not always sufficiently dispersed and the precipitation caused by aggregation of the pigment during storage cannot be sufficiently suppressed. In addition, to meet a recent demand for high-gloss image quality equivalent to quality of film photos, pigment particles need to be dispersed so as to have a smaller particle size. Therefore, there has been a strong demand for addressing the above-described problems.

The precipitation caused by aggregation of a pigment has been significantly reduced and the dispersion stability of the water-based pigment dispersion liquid has been significantly improved by adding a diol compound having a specific structure in a kneading step of a pigment to prepare a pigment dispersion which contains the diol compound and is in a solid form at room temperature and then by dispersing the pigment dispersion in a water-based medium. See Japanese Unexamined Patent Application Publication No. 2007-254735 However, since Pigment Yellow 155 is a pigment whose particles are not easily dispersed finely and pigments of different colors used together in an inkjet recording method provide higher gloss, there has been a demand for further improving the gloss of formed images by finely dispersing a pigment.

SUMMARY OF THE INVENTION

A yellow water-based pigment dispersion liquid is provided that includes pigment particles dispersed with a significantly small particle size, that has excellent dispersion stability, that causes less precipitation even at low viscosity, and that provides high gloss when the dispersion liquid is used as a main component of inkjet recording ink.

By suppressing so-called bridging aggregation in which a resin bridges pigment particles to cause the aggregation of the pigment particles particularly in a dispersion step or a step of drying ink, the dispersibility of the pigment is further improved, which is effective for improving gloss. Pigment dispersion has been realized that suppresses the bridging aggregation between pigment particles with a resin, by efficiently coating, in advance, the surface of the bis-acetoacetallylide pigment with a styrene-acrylic acid copolymer resin. That is, addition effects of various additives have been studied regarding the coating of the pigment surface with the resin in a kneading stage of mixing the pigment and the resin and, at the same time, the effects of the additives on downstream processes and properties of final ink products have been confirmed. When an acetylene glycol surfactant is used as the additive, a pigment dispersion that provides high dispersibility and gloss can be produced.

A pigment composition is provided which is in a solid form at room temperature, produced by kneading a mixture containing a bis-acetoacetallylide pigment (a), a styrene-acrylic acid copolymer (b), a basic compound (c), a humectant (d), and a kneading aid (e), wherein the kneading aid (e) contains a surfactant composed of a compound represented by general formula (1) below:

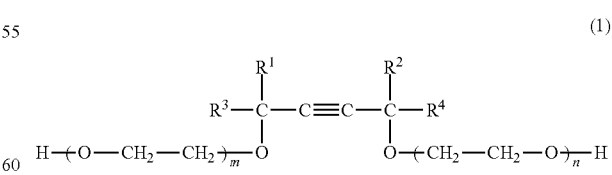

(1)

in the formula (1), R1, R2, R3, and R4 each independently represent a linear or branched alkyl group having 1 to 8 carbon atoms in its main chain, and m and n each independently represent an integer of 0 to 20 and do not represent 0 at the same time and/or a surfactant composed of a mixture containing a compound represented by general formula (2) below:

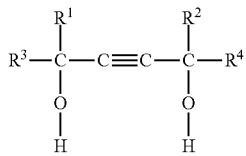

in the formula (2), R1, R2, R3, and R4 each independently represent a linear or branched alkyl group having 1 to 8 carbon atoms in its main chain and a polyoxyethylene alkyl ether whose alkyl group has 12 to 14 carbon atoms, and/or an ether compound represented by general formula (3) below:

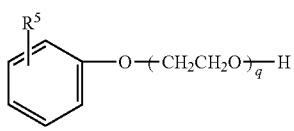

in the formula (3), q represents an integer of 1 to 30 and R5 represents a linear or branched alkyl group having 7 to 11 carbon atoms; The kneading aid (e) has an HLB value of 8 to 12. The mass ratio (e)/(a) of the kneading aid (e) to the bis-acetoacetallylide pigment (a) is 0.5/100 to 7/100. The acid value of the styrene-acrylic acid copolymer (b) is 145 to 175.

A method is also provided for producing a water-based pigment dispersion liquid, the method including a kneading step of kneading a mixture containing a bis-acetoacetallylide pigment (a), a styrene-acrylic acid copolymer (b), a basic compound (c), a humectant (d), and a kneading aid (e) to prepare a pigment composition which is in a solid form at room temperature; and a dispersion step of dispersing the pigment composition in a water-based medium, wherein the kneading aid (e) contains a surfactant composed of a compound represented by general formula (1) below:

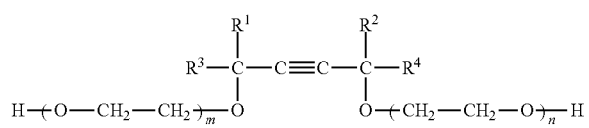

in the formula (1), R1, R2, R3, and R4 each independently represent a linear or branched alkyl group having 1 to 8 carbon atoms in its main chain, and m and n each independently represent an integer of 0 to 20 and do not represent 0 at the same time and/or a surfactant composed of a mixture containing a compound represented by general formula (2) below:

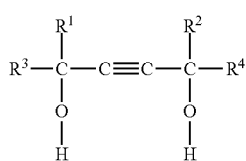

in the formula (2), R1, R2, R3, and R4 each independently represent a linear or branched alkyl group having 1 to 8 carbon atoms in its main chain), and a polyoxyethylene alkyl ether whose alkyl group has 12 to 14 carbon atoms, and/or an ether compound represented by general formula (3) below:

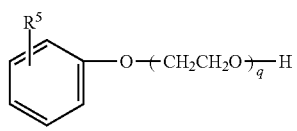

in the formula (3)q represents an integer of 1 to 30 and R5 represents a linear or branched alkyl group having 7 to 11 carbon atoms). The kneading aid (e) has an HLB value of 8 to 12. The mass ratio (e)/(a) of the kneading aid (e) to the bis-acetoacetallylide pigment (a) is 0.5/100 to 7/100. The acid value of the styrene-acrylic acid copolymer (b) used in the kneading step is 145 to 175.

An inkjet recording ink is also provided containing the water-based pigment dispersion liquid described above as a main component.

In the pigment dispersion, when the bis-acetoacetallylide pigment (a), the styrene-acrylic acid copolymer (b), the basic compound (c), and the humectant (d) are kneaded with each other to prepare a pigment dispersion which is in a solid form at room temperature and is used for a water-based pigment dispersion liquid for inkjet recording, an acetylene glycol surfactant having a specific structure and HLB value is added as the kneading aid (e) in the predetermined amount range. Therefore, the pigment surface is wetted due to the surfactant, and the adsorption of the styrene-acrylic acid copolymer onto the pigment surface properly proceeds. In addition, bridging aggregation between pigment particles does not occur in the production of the pigment dispersion and thus a pigment dispersion that can be significantly easily dispersed in a water-based medium can be prepared.

The pigment dispersion is easily handled as a solid pigment dispersion containing a bis-acetoacetallylide pigment in a high concentration or a modified pigment. By dispersing the pigment dispersion alone or the pigment dispersion and other coloring agents in a water-based medium, a water-based pigment dispersion liquid can be easily produced. The water-based pigment dispersion liquid produced through a kneading step of preparing the pigment dispersion and a step of dispersing the pigment dispersion in a water-based medium has excellent dispersion stability with less aggregation and pigment precipitation in the water-based medium because the size of pigment particles is decreased and the surfaces of the particles are properly coated with a resin. The inkjet recording ink containing the water-based pigment dispersion liquid as a main component has excellent dispersion stability with less aggregation and pigment precipitation in the water-based medium like the water-based pigment dispersion liquid and provides excellent gloss and light resistance.

DETAILED DESCRIPTION OF THE INVENTION

Each of components of the pigment dispersion will now be further described in detail. A bis-acetoacetallylide pigment has a structure represented by general formula (4) or general formula (5) below:

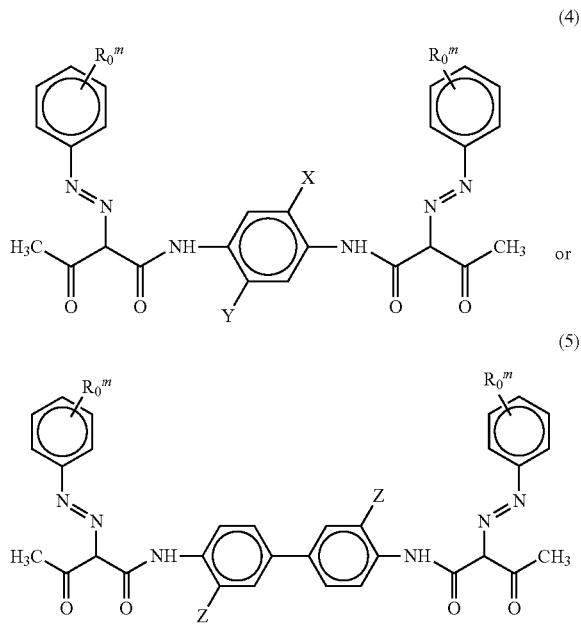

In the formula, $R_0$ independently represents $CH_3$, $OCH_3$, $OC_2H_5$, Cl, Br, $NO_2$, or $COOCH_3$; m is 0 to 3; X and Y each independently represent H, $CH_3$, $OCH_3$, or Cl; and Z represents $CH_3$, $OCH_3$, or Cl.

Examples of the pigment represented by the general formula (4) or general formula (5) include C.I. Pigment Yellow 155, C.I. Pigment Yellow 16, and C.I. Pigment Yellow 98.

In particular, C.I. Pigment Yellow 155 represented by chemical formula (6) below is suitable in terms of color developability and durability.

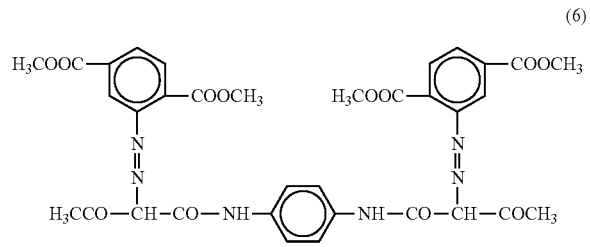

The average particle size of the pigment measured by electron microscopic observation is preferably 200 nm or less and more preferably 150 nm or less. If the particle size is more than 200 nm, high gloss is not achieved and the jettability of ink is often adversely affected. Herein, the average particle size of a pigment is obtained by measuring the sizes of 100 pigment particles in a major axis direction and by averaging the sizes.

A styrene-acrylic acid copolymer (b) contains at least a styrene monomer and acrylic acid and/or methacrylic acid and preferably contains all of a styrene monomer, acrylic acid, and methacrylic acid. In the monomer composition of the styrene-acrylic acid copolymer (b), the ratio of the amount of a styrene monomer unit relative to the total amount of all monomer units is preferably 60% or more by mass, more preferably 60 to 90% by mass, and further preferably 70 to 90% by mass. In particular, the ratio of the total amount of a styrene monomer unit, an acrylic acid monomer unit, and a methacrylic acid monomer unit relative to the total amount of all monomer units is preferably 95% or more by mass.

In the case where the styrene-acrylic acid copolymer (b) used for a water-based pigment dispersion liquid for inkjet recording has a styrene monomer unit in a large amount of 60% or more by mass relative to the total amount of all monomer units, the copolymer favorably adsorbs onto the pigment surface which is rich in hydrophobic components and thus good dispersibility of the pigment can be maintained. In the production method, the copolymer strongly adsorbs onto the surface of the bis-acetoacetallylide pigment, in particular, Pigment Yellow 155. Compared with the case where the copolymer is used for other pigments, stable dispersibility with less precipitation is maintained. When the ratio of the styrene monomer unit is 60% or more by mass, excellent recording characteristics for plain paper and high recording density of formed images can be achieved using an inkjet recording ink obtained from the water-based pigment dispersion liquid. In addition, high water resistance of printed letters and formed images is provided. When the ratio of the styrene monomer unit is 60 to 90% by mass, good affinity of the styrene-acrylic acid copolymer (b) for a water-based medium can be maintained and the dispersibility and dispersion stability of a pigment in the water-based pigment dispersion liquid can be improved. As a result, when the copolymer is used for an inkjet recording ink, good discharge stability and printing stability can be achieved.

The acid value of the styrene-acrylic acid copolymer (b) used in the water-based pigment dispersion liquid is 145 to 175 mgKOH/g. When the acid value is more than 145 mgKOH/g, sufficient hydrophilicity is achieved. Therefore, when an inkjet recording ink is produced, the reaggregation of a pigment in the composition is not easily caused and stable dispersibility can be achieved. When the acid value is less than 175 mgKOH/g, the copolymer has an appropriate hydrophilicity. Therefore, the adsorption onto the pigment surface, which is basically hydrophobic, is favorably maintained without being impaired. In addition, when an ink is produced and an image is formed on a recording medium, high water resistance of ink-printed matter is also maintained.

The styrene-acrylic acid copolymer (b) has a styrene monomer unit and an acrylic acid monomer unit or a methacrylic acid monomer unit. A publicly known compound can be used as the styrene monomer unit that constitutes the styrene-acrylic acid copolymer (b). Examples of the compound include alkylstyrenes such as styrene, methylstyrene, -methylstyrene, 2,4-dimethylstyrene, -ethylstyrene, -butylstyrene, and -hexylstyrene; halogenated styrenes such as 4-chlorostyrene, 3-chlorostyrene, and 3-bromostyrene; and 3-nitrostyrene, 4-methoxystyrene, and vinyltoluene.

Among these styrene monomers, an alkylstyrene monomer is preferably used and a styrene monomer is most preferably used.

The styrene-acrylic acid copolymer (b) may contain other monomers that can be polymerized with the styrene monomer, acrylic acid, and methacrylic acid. The total amount of the monomers other than the styrene monomer, acrylic acid, and the methacrylic acid is preferably less than 5% by mass. Examples of the monomer include (meth)acrylates such as methyl (meth)acrylate, ethyl (meth)acrylate, n-propyl (meth)acrylate, isopropyl (meth)acrylate, n-butyl (meth)acrylate, sec-butyl (meth)acrylate, tert-butyl (meth)acrylate, 2-methylbutyl (meth)acrylate, 2-ethylbutyl (meth)acrylate, 3-methylbutyl (meth)acrylate, 1,3-dimethylbutyl (meth)acrylate, pentyl (meth)acrylate, hexyl (meth)acrylate, 2-ethylhexyl (meth)acrylate, heptyl (meth)acrylate, octyl (meth)acrylate, and nonyl (meth)acrylate; (meth)acrylate derivatives such as 2-ethoxyethyl acrylate, 3-ethoxypropyl acrylate, 2-ethoxybutyl acrylate, 3-ethoxybutyl acrylate, dimethylaminoethyl (meth)acrylate, hydroxyethyl (meth)acrylate, hydroxypropyl (meth)acrylate, hydroxybutyl (meth)acrylate, ethyl-1-(hydroxymethyl)acrylate, and methyl-1-(hydroxymethyl)acrylate; aryl (meth)acrylates and aralkyl (meth)acrylates such as phenyl (meth)acrylate, benzyl (meth)acrylate, and phenylethyl (meth)acrylate; mono(meth)acrylates of polyhydric alcohols and polyhydric phenols such as diethylene glycol, triethylene glycol, polyethylene glycol, glycerin, and bisphenol A; and dialkyl maleates such as dimethyl maleate and diethyl maleate. One or more of these monomers can be added as monomer components.

The weight-average molecular weight of the styrene-acrylic acid copolymer (b) is preferably 6,000 to 40,000, more preferably 7,500 to 30,000, and further preferably 7,500 to 14,000. If the weight-average molecular weight is less than 6,000, the particle size of dispersed particles at the initial stage at which a water-based pigment dispersion liquid is formed is easily decreased, but the coating of the pigment with the copolymer tends to become insufficient and precipitation tends to occur. Furthermore, it is difficult to achieve sufficient gloss.

If the weight-average molecular weight of the styrene-acrylic acid copolymer (b) is more than 40,000, the viscosity of an inkjet recording ink prepared from a water-based pigment dispersion liquid containing such a copolymer is easily increased and the discharge stability of the ink tends to decrease.

The styrene-acrylic acid copolymer (b) may be a random copolymer, a block copolymer, or a graft copolymer. An example of the graft copolymer is a graft copolymer having a stem or branch constituted by polystyrene or a copolymer of styrene and a nonionic monomer that can be copolymerized with styrene and a branch or stem constituted by a copolymer of acrylic acid, methacrylic acid, and a monomer containing styrene. The styrene-acrylic acid copolymer (b) may be a mixture of the above-described copolymer and a random copolymer.

In the pigment dispersion, the mass ratio (b)/(a) of the styrene-acrylic acid copolymer (b) to the bis-acetoacetallylide pigment (a) is preferably 10/100 to 40/100 and particularly preferably 18/100 to 25/100. If the mass ratio (b)/(a) is less than 10/100, the dispersion stability when a water-based pigment dispersion liquid is produced is decreased. In addition, when an inkjet recording ink is produced using the water-based pigment dispersion liquid, the rubbing resistance tends to decrease. If the mass ratio (b)/(a) is more than 40/100, the viscosity of an inkjet recording ink is increased and the discharge stability tends to decrease. In particular, to maintain good high-temperature storage stability that is required for use of thermal jet type inkjet recording inks, it is important to set the ratio (b)/(a) in the above-described range.

The styrene-acrylic acid copolymer (b) is used together with a basic compound (c) to neutralize its acrylic acid sites. The basic compound (c) softens a resin in the kneading step and causes a coating process of a pigment with the resin to smoothly proceed. In addition, the basic compound (c) improves the dispersibility of the pigment coated with the resin in a water-based medium. Either of inorganic basic compounds or organic basic compounds can be used as the basic compound (c). Examples of the organic basic compound include amines such as methylamine, dimethylamine, trimethylamine, ethylamine, diethylamine, and triethylamine; and alcohol amines such as triethanolamine, diethanolamine, and methyldiethanolamine. Examples of the inorganic basic compound include hydroxides of alkali metals such as potassium and sodium; carbonates of alkali metals such as potassium and sodium; carbonates of alkaline-earth metals such as calcium and barium; and ammonium hydroxide.

In particular, when a water-based pigment dispersion liquid is produced from the pigment dispersion and furthermore when an inkjet recording ink is produced from the water-based pigment dispersion liquid, the alkali metal hydroxides and alcohol amines are suitably used in terms of dispersibility, storage stability, decap properties of inkjet printers, and water resistance of prints. The alkali metal hydroxide such as potassium hydroxide, sodium hydroxide, or lithium hydroxide among the basic compounds contributes to a decrease in the viscosity of the water-based pigment dispersion liquid and is preferably used in terms of discharge stability of inkjet recording inks. In particular, potassium hydroxide is preferred.

The alkali metal hydroxide is preferably used in the form of an aqueous solution. The amount of alkali metal hydroxide added is based on the acid value of the styrene-acrylic acid copolymer (b), and the alkali metal hydroxide is preferably added so that the neutralization ratio is 80 to 120%. A neutralization ratio of 80% or more is preferred in terms of an improvement in the dispersing rate of the pigment dispersion in a water-based medium when the water-based pigment dispersion liquid is produced from the pigment dispersion, the dispersion stability of the water-based pigment dispersion liquid, and storage stability. Furthermore, a neutralization ratio of 120% or less is preferred in terms of the prevention of gelation during long-term storage of the water-based pigment dispersion liquid or the inkjet recording ink and the water resistance of prints produced with the ink.

The neutralization ratio is a percentage of the amount of alkali metal hydroxide added relative to the amount of alkali metal hydroxide required to neutralize all carboxy groups in the styrene-acrylic acid copolymer (b). The neutralization ratio is calculated from formula below.

Neutralization ratio (%)=((Mass of basic compound (g)56 1000)/(Acid value of resin Equivalent of basic compound Amount of resin (g)))100

A kneading aid (e) contained in the pigment dispersion and used in the method for producing the water-based pigment dispersion liquid contains a surfactant composed of an acetylene glycol compound and/or a surfactant composed of a mixture containing an acetylene glycol compound and an ether compound. The kneading aid (e) has an HLB value in a specific range.

That is, the kneading aid (e) contains a surfactant composed of a compound represented by general formula (1) below:

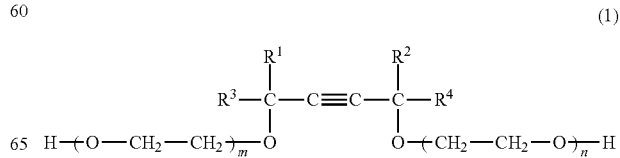

(1)

in the formula (1), R1, R2, R3, and R4 each independently represent a linear or branched alkyl group having 1 to 8 carbon atoms in its main chain, and m and n each independently represent an integer of 0 to 20 and do not represent 0 at the same time; and/or
a surfactant composed of a mixture containing a compound represented by general formula (2) below:

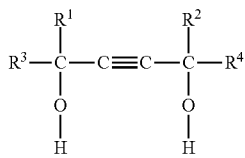

in the formula (2), R1, R2, R3, and R4 each independently represent a linear or branched alkyl group having 1 to 8 carbon atoms in its main chain and
a polyoxyethylene alkyl ether whose alkyl group has 12 to 14 carbon atoms,
and/or
an ether compound represented by general formula (3) below:

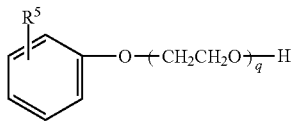

in the formula (3), q represents an integer of 1 to 30 and R5 represents a linear or branched alkyl group having 7 to 11 carbon atoms. The kneading aid (e) has an HLB value of 8 to 12.

The kneading aid (e) is preferably the surfactant composed of the mixture containing the compound represented by the general formula (2) below:

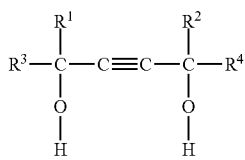

in the formula (2), R1, R2, R3, and R4 each independently represent a linear or branched alkyl group having 1 to 8 carbon atoms in its main chain, and
the polyoxyethylene alkyl ether whose alkyl group has 12 to 14 carbon atoms, and/or
the ether compound represented by the general formula (3) below:

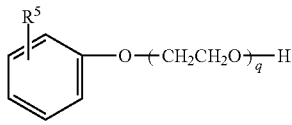

in the formula (3), q represents an integer of 1 to 30 and R5 represents a linear or branched alkyl group having 7 to 11 carbon atoms.

In the acetylene glycol compounds represented by the general formula (1):

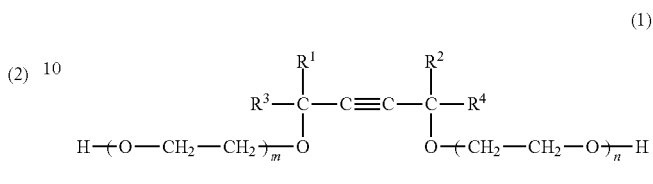

in the formula (1), R1, R2, R3, and R4 each independently represent a linear or branched alkyl group having 1 to 8 carbon atoms in its main chain, and m and n each represent an integer of 0 to 20 and do not represent 0 at the same time and represented by the general formula (2):

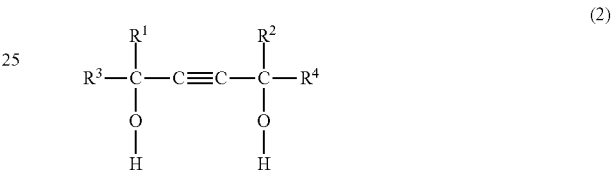

in the formula (2), R1, R2, R3, and R4 each independently represent a linear or branched alkyl group having 1 to 8 carbon atoms in its main chain, the number of carbon atoms in the main chain of an alkyl group represented by R1, R2, R3, and R4 is preferably 1 to 6 and more preferably 1 to 4. Particularly preferably, R1 and R2 each represent a methyl group and R3 and R4 each independently represent a group selected from the group consisting of a methyl group, an ethyl group, a propyl group, a butyl group, and an isobutyl group. Most preferably, R1 and R2 each represent a methyl group and R3 and R4 each represent an isobutyl group. In m and n of the general formula (1), the total of m+n is preferably 10 or less, more preferably 6 or less, and further preferably 4 or less.

In particular, when m and n each represent 0, the acetylene glycol surfactant represented by the general formula (1) is the acetylene glycol compound represented by the general formula (2). Herein, the compound is used as a surfactant in the form of a mixture containing the polyoxyethylene alkyl ether whose alkyl group has 12 to 14 carbon atoms or the ether compound represented by the general formula (3) below:

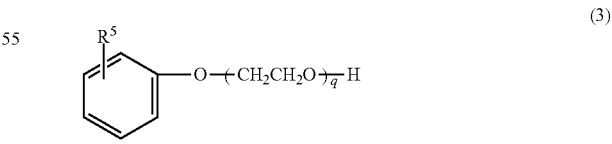

in the formula (3), q represents an integer of 1 to 30 and R5 represents a linear or branched alkyl group having 7 to 11 carbon atoms. Even in the form of such a mixture, the acetylene glycol compound represented by the general formula (2) and these ether compounds form an intermolecular association and function as a surfactant substantially having an ethylene oxide chain, which has an affinity for water, like the acetylene glycol surfactant. In particular, it is advantageous to use such a mixture as a surfactant to reduce the viscosity and surface tension of ink.

In particular, when the acetylene glycol compound represented by the general formula (2) is used, a surfactant composed of a mixture containing the polyoxyethylene alkyl ether whose alkyl group has 12 to 14 carbon atoms and/or the ether compound represented by the general formula (3) is preferably used as the kneading aid (e).

The acetylene glycol compound represented by the general formula (2) is particularly preferably used in the form of a surfactant composed of a mixture with the polyoxyethylene alkyl ether whose alkyl group has 12 to 14 carbon atoms.

The polyoxyethylene alkyl ether whose alkyl group has 12 to 14 carbon atoms is an ether of polyoxyethylene and an alkyl alcohol having 12 to 14 carbon atoms, preferably an ether of polyoxyethylene and a secondary alcohol whose alkyl group has 12 to 14 carbon atoms, and more preferably a compound represented by general formula (7) below:

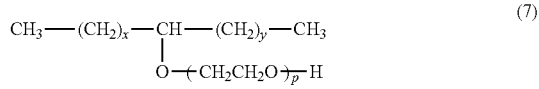

in the formula (7), x+y is a positive integer of 9 to 11 and p represents an integer of 2 to 30. Herein, p preferably represents an integer of 2 to 20.

The compound represented by the general formula (3) below:

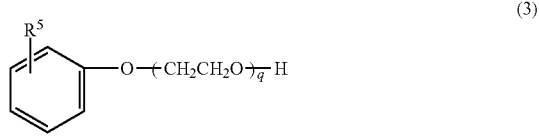

in the formula (3), q represents an integer of 1 to 30 and R5 represents a linear or branched alkyl group having 7 to 11 carbon atoms is more preferably polyoxyethylene nonylphenyl ether and q preferably represents an integer of 1 to 20.

When the acetylene glycol compound represented by the general formula (2) below:

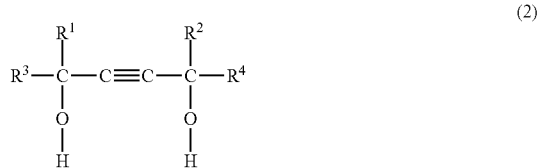

in the formula (2), R1, R2, R3, and R4 each independently represent a linear or branched alkyl group having 1 to 8 carbon atoms in its main chain is used together with the above-described ether compound, the mixing ratio of ether compound/acetylene glycol compound is preferably 80/100 or less by mass. When such a mixture is used, the total amount of the ether compound and the compound represented by the general formula (2) is defined as the amount of kneading aid (e).

In almost all particle dispersion systems, particles have a property of aggregation. However, the kneading aid (e) suitably improves the wettability of the particle surface of the bis-acetoacetallylide pigment (a) in the kneading step in a solid form and facilitates the adsorption of a resin onto the particle surface. The resin that has coated the particle surface of the pigment prevents the aggregation between pigment particles and thus fine particles of the pigment can be stabilized and dispersed in water.

More importantly, the kneading aid (e) adsorbs onto the pigment surface onto which the resin does not adsorb. This can significantly reduce the aggregation caused when molecular chains of the resin bridge portions of different pigment particle surfaces onto which the resin does not adsorb.

To properly produce the effects of the kneading aid (e), the kneading aid (e) needs to have an HLB value in a specific range. The surfactant used in the kneading aid has a hydrophilic portion and a hydrophobic portion in its molecule. The HLB (hydrophile-lipophile balance) represents a balance between a hydrophilic portion and a hydrophobic portion of a molecule, which is utilized in the field of surfactants. The HLB has a value of 0 to 20, and a higher HLB value means higher hydrophilicity. An HLB value defined by Griffin's equation below is used.

Griffin's equation:

HLB=20 (total formula weight of hydrophilic portion/molecular weight)

For example, in the case of a surfactant (Surfynol 420 manufactured by Nissin Chemical Industry Co., Ltd.) that is an ethylene oxide (20 mass %) adduct of 1,4-diisobutyl-1,4-dimethylbutynediol, an ethylene oxide portion serves as a hydrophilic portion and the HLB value is 20 20/100=4. In the case of a surfactant (Surfynol 465 manufactured by Nissin Chemical Industry Co., Ltd.) that is an ethylene oxide (65 mass %) adduct, the HLB value is 20 65/100=13.

An HLB value of a mixture is a weighted average of HLB values of all components.

The main mechanism for achieving the dispersion stability of the pigment with the kneading aid (e) is repulsion caused by steric hindrance of polymer chains of a resin layer that has adsorbed onto the pigment surface. In addition, electrostatic repulsion caused by an electric charge of carboxy anions of the resin that has adsorbed is exemplified. To make such a stabilizing mechanism properly work, the HLB value of the surfactant used in the kneading aid (e) needs to be 8 to 12 and is preferably 8 or more and less than 11. If the HLB value is less than 8, the hydrophilicity is insufficient. Therefore, even if the kneading aid (e) favorably adsorbs onto the pigment surface, the dispersibility of the pigment in water is not significantly improved. If the HLB value is more than 12, the hydrophilicity is good, but the adsorbing property onto the pigment surface tends to degrade.

Regarding the amount of kneading aid (e) added, the mass ratio (e)/(a) of the kneading aid (e) to the bis-acetoacetallylide pigment (a) is 0.5/100 to 7/100 and preferably 0.5/100 to 6/100. If the amount is less than the lower limit of this range, the addition effects of the kneading aid (e) tend to be not produced. If the amount is more than the upper limit of this range, the concentration of the kneading aid (e) is increased. Therefore, competitive adsorption of the resin and the kneading aid (e) onto the bis-acetoacetallylide pigment (a) is caused, and the adsorption of the resin tends to be hindered. The kneading aid (e) is a compound composed of the surfactant specified or a mixture containing the surfactant specified. In the case where the kneading aid (e) is the mixture, the kneading aid (e) may contain a small amount of organic solvent and the like, in addition to the surfactant. In this case, the above-described compound that is specified as an active component contained in the kneading aid (e) is contained as a main component in an amount of 70% or more by mass and preferably 80% or more by mass. However, even in the case where the amount is less than 70% by mass, the effects can be produced as long as the surfactants specified are contained in the kneading aid (e) so that the mass ratio of all the surfactants to the bis-acetoacetallylide pigment (a) is 0.5/100 to 7/100.

Examples of the surfactant that can be used as the kneading aid (e) include Surfynol 440 (ethylene oxide (40 mass %) adduct of 1,4-diisobutyl-1,4-dimethylbutynediol, HLB=8, manufactured by Nissin Chemical Industry Co., Ltd.), Surfynol CT211 (mixture containing 40% by mass of 1,4-diisobutyl-1,4-dimethylbutynediol and 43% by mass of ether compound of secondary alcohol whose alkyl group has 12 to 14 carbon atoms and polyoxyethylene, HLB=10, manufactured by Nissin Chemical Industry Co., Ltd.), and Surfynol 111 (mixture containing 40% by mass of 1,4-diisobutyl-1,4-dimethylbutynediol and 43% by mass of polyoxyethylene nonylphenyl ether, HLB=10, manufactured by Nissin Chemical Industry Co., Ltd.).

These commercially available surfactant products mainly contain the above-described compound or mixture as a surfactant, and thus can be directly used as the kneading aid. The total amount of compounds serving as the above-described surfactants in the surfactant product is preferably 70% or more by mass and more preferably 80% or more by mass.

A publicly known humectant can be used as a humectant (d) contained in the pigment dispersion. Examples of the humectant (d) include polyols such as glycerin, ethylene glycol, diethylene glycol, triethylene glycol, tetraethylene glycol, polyethylene glycol, propylene glycol, polypropylene glycol, 1,3-propanediol, 1,4-butanediol, 1,5-pentanediol, 1,6-hexanediol, 1,2,6-hexanetriol, trimethylolpropane, and pentaerythritol; lactams such as 2-pyrrolidone, N-methyl-2-pyrrolidone, and -caprolactam; and 1,3-dimethylimidazolidine. Among them, diethylene glycol is preferred. Since such a humectant (d) has a high boiling point, the humectant (d) does not volatilize in the kneading step and kneading conditions are stably maintained. Furthermore, since the humectant (d) is intrinsically part of the composition of an inkjet recording ink, the humectant (d) does not need to be distilled off when a water-based pigment dispersion liquid or an inkjet recording ink is produced. Thus, an inkjet recording ink can be easily produced.

The water-based pigment dispersion liquid can be produced by dispersing the above-described pigment dispersion in water or a water-based medium mainly composed of water. Examples of the water-based medium include water and a mixture containing water and a humectant. The mixture can be prepared in consideration of the vaporization-preventing effect of the humectant on the water-based pigment dispersion liquid, viscosity, and the like. The concentration of the pigment in the water-based pigment dispersion liquid is preferably 1 to 30% by mass and more preferably 10 to 20% by mass in order to achieve high printing density and maintain the jettability of an inkjet recording ink to be produced.

The inkjet recording ink can be produced by suitably adding, in addition to the water-based medium, publicly known additives such as a humectant, a penetrant, an antiseptic, a fungicide, a surfactant, an antifoaming agent, an antioxidant, and an ultraviolet absorber to the water-based pigment dispersion liquid and by adjusting the pigment concentration and viscosity.

A method for producing the pigment dispersion and a method for producing the water-based pigment dispersion liquid will now be described in detail.

The pigment dispersion can be produced by the following method, for example. A method for producing the pigment dispersion includes a kneading step of kneading a mixture containing a bis-acetoacetallylide pigment (a), a styrene-acrylic acid copolymer (b), a basic compound (c), a humectant (d), and a kneading aid (e) to prepare a pigment composition that is in a solid form at room temperature; and a dispersion step of dispersing the pigment composition in a water-based medium. The kneading aid (e) contains a surfactant composed of a compound represented by general formula (1) below:

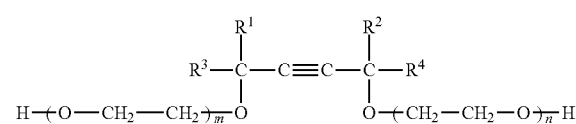

in the formula (1), R1, R2, R3, and R4 each independently represent a linear or branched alkyl group having 1 to 8 carbon atoms in its main chain, and m and n each represent an integer of 0 to 20 and do not represent 0 at the same time and/or
a surfactant composed of a mixture containing a compound represented by general formula (2) below:

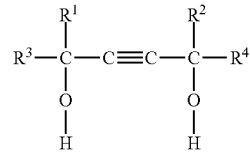

in the formula (2), R1, R2, R3, and R4 each independently represent a linear or branched alkyl group having 1 to 8 carbon atoms in its main chain and
a polyoxyethylene alkyl ether whose alkyl group has 12 to 14 carbon atoms, or
an ether compound represented by general formula (3) below:

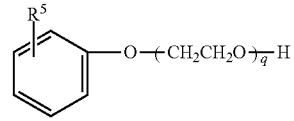

in the formula (3), q represents an integer of 1 to 30 and R5 represents a linear or branched alkyl group having 7 to 11 carbon atoms. The kneading aid (e) has an HLB value of 8 to 12. The mass ratio (e)/(a) of the kneading aid (e) to the bis-acetoacetallylide pigment (a) is 0.5/100 to 7/100. The acid value of the styrene-acrylic acid copolymer (b) used in the kneading step is 145 to 175.

In the kneading step of the method for producing a pigment dispersion, when the mixture containing a bis-acetoacetallylide pigment (a), a styrene-acrylic acid copolymer (b), a basic compound (c), a humectant (d), and a kneading aid (e) is kneaded, the kneading aid (e) functions as a dispersion aid of the bis-acetoacetallylide pigment (a) during kneading and properly causes the coating of the surface of the bis-acetoacetallylide pigment (a) with the styrene-acrylic acid copolymer (b) and the dispersion of the pigment (a).

It is important to efficiently perform uniform mixing of the pigment and resin and disintegration of the pigment by performing kneading using the kneading aid (e) as a dispersion aid in a state in which the solid content is high and thus a high shearing force is exerted. By continuously kneading a lump of pigment particles in such a state in the presence of the resin, a sufficient shearing force is exerted on the mixture from a kneader and the pigment in an aggregated state is efficiently disintegrated. The styrene-acrylic acid copolymer (b) that has swollen due to water, the basic compound (c), and the humectant (d) is expanded on the surface of the pigment that has been disintegrated into fine particles. Thus, the particle interface of the bis-acetoacetallylide pigment (a) can be efficiently coated with the styrene-acrylic acid copolymer (b).

Regarding the amount of humectant (d) used in the kneading step of the method for producing a water-based pigment dispersion liquid, the mass ratio (d)/(a) of the humectant (d) to the bis-acetoacetallylide pigment (a) is preferably 16/100 to 35/100. If the mass ratio (d)/(a) is less than 16/100, the pigment particles tend to not gather sufficiently during kneading and the efficiency of kneading performed in the form of powder easily decreases. If the mass ratio (d)/(a) is more than 35/100, the mixture easily becomes a liquid state or a state close to such a liquid state during kneading, and the styrene-acrylic acid copolymer (b) tends to shift to a liquid phase. Therefore, the pigment surface is sometimes not sufficiently coated with the copolymer. Furthermore, the mass ratio (d)/(a) is more than 35/100, the pigment particles easily shift to the liquid phase and it becomes harder to apply sufficient stress to the pigment. As a result, the kneading operation in a solid form, which is intended, sometimes cannot be efficiently performed. The optimum range of the ratio (d)/(a) is slightly changed in accordance with kneading temperature. In general, a smaller amount of humectant (d) is required at higher temperature. However, the ratio (d)/(a) within the above-described range can be employed in a normal kneading temperature range without causing any problem.

When the styrene-acrylic acid copolymer (b) is sufficiently present on the surface of the bis-acetoacetallylide pigment (a) so as to coat the pigment, a sufficient precipitation-suppressing effect is achieved after an inkjet recording ink is produced and sufficient gloss of images is achieved after the ink is printed. However, if the amount of styrene-acrylic acid copolymer (b) is excessively high and thus the styrene-acrylic acid copolymer (b) diffuses into a water-based medium, the viscosity of ink easily increases and the jettability of the ink tends to decrease.

The mass ratio (b)/(a) of the styrene-acrylic acid copolymer (b) to the bis-acetoacetallylide pigment (a) is preferably 10/100 to 40/100. By setting the amount of styrene-acrylic acid copolymer (b) added in this range, the disintegration of the pigment efficiently proceeds. Furthermore, when the water-based pigment dispersion liquid is produced, an increase in the viscosity of the dispersion liquid and a decrease in the jettability of an inkjet recording ink that are caused by presence of an excessive resin that has not adsorbed onto the pigment in a water-based medium are prevented.

When an alkali metal hydroxide is used as the basic compound (c), the alkali metal hydroxide is normally used in the form of an aqueous solution. Herein, the amount of water is preferably minimized. The ratio of the amount of water relative to the amount of pigment is preferably 15% or less by mass and more preferably 8% or less by mass. The viscosity of the water-based dispersion liquid is preferably less than 4.0 mPa·s and more preferably less than 3.5 mPa·s at room temperature. When the viscosity of the water-based pigment dispersion liquid is in such a low viscosity range, an inkjet recording ink having a sufficient discharge speed is easily produced from the water-based pigment dispersion liquid.

The method for producing a water-based pigment dispersion liquid includes a kneading step of kneading a high solid content mixture containing a bis-acetoacetallylide pigment (a), a styrene-acrylic acid copolymer (b), a basic compound (c), a humectant (d), and a kneading aid (e), and the pigment dispersion produced by the method including the kneading step is dispersed in a water-based medium to produce a water-based pigment dispersion liquid.

In the kneading step of preparing the pigment dispersion, the solid content is preferably high so that the mixture kneaded is not in the form of liquid. In the form of liquid, at least part of or the entire styrene-acrylic acid copolymer (b) easily diffuses into the liquid, and the copolymer is not sufficiently present on the pigment surface and the coating tends to be not sufficiently achieved. If the mixture being subjected to kneading is in a liquid form, the mixture containing the pigment and the resin is not kneaded under a high shearing force and the disintegration of the pigment becomes insufficient. Consequently, the effects, such as a decrease in the size of particles of the pigment and prevention of precipitation, tend to be not produced as in the case where a water-based pigment dispersion liquid is produced by only dispersing a pigment in liquid, which has been conventionally performed.

To efficiently perform kneading, the solid content of a colored kneaded material during kneading is preferably 70 to 90% by mass and more preferably 70 to 80% by mass. If the solid content is in this range, the dilution and dispersion of the mixture in a water-based medium smoothly proceed after the completion of kneading, and high gloss and stability are achieved as shown in Examples and Comparative Examples. If the solid content is more than 90% by mass, a long time tends to be required for the dilution and dispersion after kneading. Furthermore, the material transfer in the kneaded material is slow and the dispersion easily becomes nonuniform. This tends to pose a problem in that sufficient gloss and long-term dispersion stability are not easily achieved. If the solid content is less than 70% by mass, it is difficult to exert a strong shearing force during kneading. As a result, the disintegration of the pigment and the coating of the pigment surface with the styrene-acrylic acid copolymer (b) do not sufficiently proceed, and a decrease in the size of particles of the pigment and dispersion become insufficient to cause precipitation. This also tends to pose a problem in that sufficient gloss and long-term dispersion stability are not easily achieved.

The solid content mentioned is the ratio of the total mass of the pigment (a) and the styrene-acrylic acid copolymer (b) relative to the total mass of all components.

Before starting kneading, a styrene-acrylic acid copolymer (b), a basic compound (c), a humectant (d), and a kneading aid (e) can be added to a powdery bis-acetoacetallylide pigment (a) to prepare a mixture. However, a bis-acetoacetallylide pigment (a) and a powdery styrene-acrylic acid copolymer (b) are preferably mixed in advance to prepare a mixed powder. A basic compound (c), a humectant (d), and a kneading aid (e), which are other essential components, are added to the mixed powder and then kneading is preferably started. The kneader preferably provides a strong shearing force that is effective for kneading a solid material. An example of a simple method is a method in which a solid mixture is kneaded using a typical container such as a large mortar or bowl made of stone or metal together with a large pestle or pounder. In particular, in the case of production in a small amount, a mortar and a pestle can be used instead of the foregoing. Even in such a method, a solid colored kneaded material having good reproducibility in terms of its characteristics can be prepared because the disintegration of the pigment and the coating of the pigment surface with the resin are made to reach a level of almost complete saturation by performing kneading for 30 minutes or longer. In the case where temperature is precisely controlled or a large amount of kneaded material is prepared, a kneader equipped with a roll or an impeller or a publicly known kneader can be used. In particular, a pressure kneader, a Henschel mixer, and a planetary mixer each including a mixing tank and an impeller are preferably used. Furthermore, a kneader whose impeller can rotate and revolve is suitable. Typical examples of such a kneader include a pressure kneader and a planetary mixer. A planetary mixer is particularly preferred because it can cover a wider range of viscosity and can perform kneading at lower temperature. The planetary mixer is a planetary kneader, which is a general term of kneaders having two or more impellers that conduct sun-and-planet motion (hereinafter referred to as "planetary mixer").

Particles of the bis-acetoacetallylide pigment (a) which is a main component of the mixture prepared by adding the components in the kneading step coalesce with each other through the styrene-acrylic acid copolymer (b) from 2 to 20 minutes after the initiation of kneading. The aggregation preferably proceeds so that the bis-acetoacetallylide pigment (a) becomes a ball-shaped or rod-shaped aggregate. By adding the kneading aid (e), the time required for this aggregation is shortened and thus more efficient kneading is performed.

When the components become a lump, the total apparent volume including the volume of pigment powder before mixing significantly reduces to about 60%.

Since the styrene-acrylic acid copolymer (b) is neutralized with the basic compound (c), the temperature increases due to the heat of neutralization. By controlling the temperature in the above-described preferred range using the heat, the electric power required for the kneading can be economized.

To properly knead the thus-obtained lump containing the bis-acetoacetallylide pigment (a), it is important that the lump is a mixture in a solid state at room temperature and the lump can be expanded by applying a sufficient shearing force using a kneader. If the mixture in a solid state is excessively hard, the kneader may be damaged or the hue or gloss may be adversely affected due to the destruction of pigment particles.

Therefore, to properly perform kneading efficiently, the amount of each of the components added in the kneading step is preferably set in the above-described range.

To achieve a preferred state in which the additive components become a lump so that a sufficient shearing force is exerted on the solid mixture in the kneading step, preferably, the components other than the bis-acetoacetallylide pigment (a) are not added to the bis-acetoacetallylide pigment (a) at one time, but are added thereto in stages.

The kneading time is not particularly limited, but is preferably 0.2 to 6 hours and more preferably 0.5 to 3 hours. If the kneading time is shorter than 0.2 hours, the coating of the pigment surface with the resin tends to be not completed. If the kneading time is longer than 6 hours, the productivity may be decreased and the destruction of the pigment may cause a change in the hue and gloss.

The thus-obtained pigment dispersion is a colored kneaded material in a solid form at room temperature, and is convenient for long-term storage and handling as a microcapsule-type modified pigment whose surface is coated with a resin. In the preparation of the pigment dispersion the number of revolutions of the kneader can be suitably set in the range in which a strong shearing force that can properly knead the mixture is generated during kneading.

The effects produced by using the kneading aid (e) are believed to be achieved because the effects produced from the surfactant used as the kneading aid are significantly large compared with effects produced from other surfactants. The effects are believed to be specific to the combination between the bis-acetoacetallylide pigment (a) and the kneading aid (e) used in the present application as described in Comparative Examples. Thus, the effects are not produced when Pigment Yellow 185, which has a different basic chemical structure and different surface properties, is employed.

This can be explained by considering the peculiar surface properties of the bis-acetoacetallylide pigment (a). That is, the bis-acetoacetallylide pigment (a) is rich in aromatic rings, ester bonds, and amide bonds, and it is believed that—interaction and hydrogen bonds play a certain role in the interaction between the resin and the pigment, which causes a strong interaction between the resin and the pigment. Therefore, the effects of the kneading aid (e) achieved by coating the pigment surface with the resin in the kneading step are also believed to be significantly produced.

In the dispersion step of the method for producing a water-based pigment dispersion liquid, by mixing the solid colored kneaded material that is the pigment dispersion produced in the kneading step in water or a water-based medium mainly containing water, a pigment dispersion liquid can be easily produced. Herein, the colored kneaded material can be dispersed while being mixed with other coloring materials such as a dye. By mixing such a coloring material, the color can be changed into greenish yellow or reddish yellow. The surface of the bis-acetoacetallylide pigment (a) is sufficiently coated with the styrene-acrylic acid copolymer (b) having a hydrophilicity increased by the addition of the basic compound (c). The coating process properly proceeds using the kneading aid (e) of the present application as a dispersion aid, and thus a pigment composition is prepared. Therefore, by mixing the pigment composition with a water-based medium, a water-based pigment dispersion liquid can be easily produced. In particular, a water-based pigment dispersion liquid with uniformly fine pigment particles can be produced without using a typical pigment dispersing machine. The mixing with the water-based medium may be performed using a typical mixer equipped with an impeller and a mixing tank. For example, the mixing may be performed directly in the above-described kneader such as a planetary mixer. The concentration of the pigment in the thus-obtained dispersion liquid is preferably 1 to 30% by mass when the dispersion liquid is assumed to be used as an inkjet recording ink. If the concentration is less than 1% by mass, the printing density when the dispersion liquid is used for an inkjet recording ink tends to be insufficient. If the concentration is more than 30% by mass, the viscosity is excessively increased and ease of handling tends to degrade.

When the colored kneaded material that is the pigment dispersion is mixed with the water-based medium to disperse the colored kneaded material in the water-based medium, a publicly known dispersing machine may be used to achieve better dispersion or improve productivity. In particular, it is effective to introduce a step of performing dispersion with a dispersing machine that uses a medium such as a bead. When components other than water are added in the dispersion step, such a dispersing machine can be used to achieve uniform concentration of the components in the liquid. Examples of the dispersing machine that uses a medium and is used in the dispersion step include a sand mill, a paint shaker, a ball mill, a sand grinder, Dyno-Mill, Dispermat, SC Mill, Spike Mill, Agitator Mill, and Pinmill. However, as described above, the step of dispersing a pigment with a dispersing machine is not necessarily performed. When the dispersing machine is used, the dispersion needs to be finished within 10 minutes and is preferably finished within 5 minutes to prevent the detachment of the resin on the pigment surface caused by excessive dispersion. When the dispersing machine is used in the dispersion step, the colored kneaded material prepared in the kneading step is preferably mixed and diluted with a water-based medium to adjust the viscosity in a suitable viscosity range of the dispersing machine. The viscosity is preferably reduced to 15 mPa·s or less.

Regarding the mixing method of the water-based medium in the dispersion step, the colored kneaded material and the water-based medium may be mixed with each other at one time or the colored kneaded material may be mixed with the water-based medium in stages under stirring. By employing the latter method, a water-based pigment dispersion liquid having better dispersibility can be produced more efficiently. The temperature during the mixing is not particularly limited, but is suitably 5 to 70° C. The concentration of the pigment in the water-based pigment dispersion liquid produced at the completion of the dispersion step is preferably 10 to 20% by mass. A dispersion liquid produced so as to have a pigment concentration of about 1 to 7% is used as an inkjet recording ink by suitably adding the additional components described below and further adjusting the viscosity and pigment concentration. Such a dispersion liquid can also be directly used as an inkjet recording ink.

A water-based pigment dispersion liquid having a high pigment concentration can be used as a storage raw material for obtaining an inkjet recording ink. Herein, the water-based pigment dispersion liquid is stored as an intermediate for producing an ink, and, when an ink is required, water, publicly known ink components, other pigment dispersion liquids, and dyes are added to the intermediate to produce an inkjet recording ink.

In the present invention, to reduce the number of coarse particles in the dispersion liquid, a centrifugation step or a filtration step may be performed after a second step (dispersion step). By performing the step of removing such coarse particles, the discharge can be stabilized and the number of coarse particles that impair gloss can be reduced.

When an inkjet recording ink is produced from the water-based pigment dispersion liquid, an inkjet recording ink can be produced by further diluting the water-based pigment dispersion liquid with a water-based medium. The water-based medium used to dilute the water-based pigment dispersion liquid preferably contains a humectant because such a humectant contributes to the prevention of drying and the adjustment of viscosity and concentration in the inkjet recording ink. The same humectant as that used in the kneading step of preparing the pigment dispersion can be used. To prevent drying, the content of the humectant in the ink is preferably 3 to 50% by mass.

When an inkjet recording ink is produced, a penetrant can be added to improve the permeability into a recording medium or control the dot size on the recording medium. Examples of the penetrant include lower alcohols such as ethanol and isopropyl alcohol; ethylene oxide adducts of alkyl alcohols such as ethylene glycol hexyl ether and diethylene glycol butyl ether; and propylene oxide adducts of alkyl alcohols such as propylene glycol propyl ether. The content of the penetrant in the ink is preferably 0.01 to 10% by mass.

When an inkjet recording ink is produced, a surfactant can be added to adjust ink properties such as surface tension. The surfactant that can be added for such a purpose is not particularly limited, and may be the same as or different from the surfactant added as the kneading aid (e) during kneading. Examples of the surfactant include anionic surfactants, nonionic surfactants, cationic surfactants, and amphoteric surfactants. Among them, anionic surfactants and nonionic surfactants are preferably used. Additive components for inkjet recording ink, such as an antiseptic, a fungicide, an antifoaming agent, an antioxidant, and an ultraviolet absorber may be further optionally added, and the amount of water-based medium and the pigment concentration are adjusted. Alternatively, a water-based pigment dispersion liquid is produced by a method in which the colored kneaded material is directly mixed, in the dispersion step, with a water-based medium to which the various additive components have been added, and an inkjet recording ink may be produced from the dispersion liquid.

The water-based pigment dispersion liquid and the inkjet recording ink are stable even if being heated and provide high stability, causing less precipitation of pigments that easily precipitate, even in a low-viscosity medium. An image formed by an inkjet recording method using the inkjet recording ink provides high gloss and has high quality with excellent light resistance and color development, which are intrinsic to Pigment Yellow 155.

EXAMPLES

The present invention will now be further described in detail based on Examples.

In Synthetic Examples, Examples, and Comparative Examples below, "part" and "%" represent "part by mass" and "% by mass", respectively.

Synthetic Example 1

Into a reaction vessel equipped with a mixer, a dropping unit, and a reflux unit, 100 parts of methyl ethyl ketone was inserted, and the reaction vessel was purged with nitrogen under stirring. The temperature was increased while a nitrogen atmosphere was maintained in the reaction vessel to bring a reflux state of methyl ethyl ketone. Subsequently, a mixed solution of 77 parts of styrene, 10 parts of acrylic acid, 13 parts of methacrylic acid, and 8 parts of polymerization catalyst ("V-59" manufactured by Wako Pure Chemical Industries, Ltd.) was dropped from the dropping unit for 2 hours. From the middle of the dropping operation, the temperature of the reaction system was kept at 80° C.

After the completion of the dropping operation, the reaction was caused to proceed at the same temperature for 25 hours. In the middle of the reaction, the consumption of the raw materials was confirmed and a polymerization catalyst was suitably added. After the completion of the reaction, methyl ethyl ketone was distilled off under reduced pressure and the resultant solid was pulverized into a styrene-acrylic acid copolymer (A-1) powder. The acid value was 152 mgKOH/g and the weight-average molecular weight was 11000.

Note that the weight-average molecular weight is a value measured by a GPC (gel permeation chromatography) method and is a value based on the molecular weight of polystyrene used as a reference substance. The measurement was conducted using the equipment below under the conditions below.

Liquid-supplying pump: LC-9A
System controller: SLC-6B
Autoinjector: S1L-6B
Detector: RID-6A
the above units being manufactured by SHIMADZU CORPORATION Data processing software: Sic4801I Data Station (manufactured by SYSTEM INSTRUMENTS Co., Ltd.)
Column: GL-R400 (Guard Column)+GL-R440+GL-R450+
GL-R400M (manufactured by Hitachi Chemical Company,
Ltd.)
Elution solvent: THF
Elution flow rate: 2 ml/min
Column temperature: 35° C.

Synthetic Example 2

A styrene-acrylic acid copolymer (A-2) was synthesized by adjusting the reaction conditions of the production method of Synthetic Example 1. In the styrene-acrylic acid copolymer (A-2), the composition ratio of monomer units was styrene/acrylic acid/methacrylic acid=75/11/14 (by mass), the weight-average molecular weight was 11100, the acid value was 172 mgKOH/g, and the glass transition temperature was 108° C.

Synthetic Example 3

A styrene-acrylic acid copolymer (A-3) was synthesized by adjusting the reaction conditions of the production method of Synthetic Example 1. In the styrene-acrylic acid copolymer (A-3), the composition ratio of monomer units was styrene/acrylic acid/methacrylic acid=82/8/10 (by mass), the weight-average molecular weight was 11200, the acid value was 121 mgKOH/g, and the glass transition temperature was 109° C.

Synthetic Example 4

A styrene-acrylic acid copolymer (A-4) was synthesized by adjusting the reaction conditions of the production method of Synthetic Example 1. In the styrene-acrylic acid copolymer (A-4), the composition ratio of monomer units was styrene/acrylic acid/methacrylic acid=80/9/11 (by mass), the weight-average molecular weight was 11400, the acid value was 135 mgKOH/g, and the glass transition temperature was 107° C.

Synthetic Example 5

A styrene-acrylic acid copolymer (A-5) was synthesized by adjusting the reaction conditions of the production method of Synthetic Example 1. In the styrene-acrylic acid copolymer (A-5), the composition ratio of monomer units was styrene/acrylic acid/methacrylic acid=75/11/14 (by mass), the weight-average molecular weight was 11500, the acid value was 172 mgKOH/g, and the glass transition temperature was 109° C.

Example 1

Pigment Yellow 155 (Ink Jet Yellow 4GP manufactured by Clariant): 500 parts
Styrene-acrylic acid copolymer (acid value 155) (A-1): 100 parts
Diethylene glycol: 155 parts
Surfynol CT211: 15 parts
8N aqueous potassium hydroxide solution (solid content=34% by mass): 45.6 parts The components above were inserted, in that order, into a 50 L planetary mixer (PLM-50 manufactured by INOUE MANUFACTURING CO., LTD.) in which the temperature was kept at 60° C. and kneading was started at a rotation rate of 59 rpm and at a revolution rate of 22 rpm. After three minutes, the mixture aggregated into a rod-like shape. The mixture was continuously kneaded for 120 minutes to obtain a pigment dispersion (solid colored kneaded material). During the kneading for 120 minutes, the power consumption was repeatedly increased and decreased in a range of 5 to 15 amperes in accordance with the rotation period of an impeller. This is because, since the mixture is a semisolid having an extremely high viscosity and thus is not uniformly distributed inside the reaction vessel, a large force is exerted on the impeller every time the impeller shears the mixture periodically.

After 120 minutes, 1600 parts of ion-exchanged water was gradually added thereto for 4 hours so that the pigment dispersion was liquefied. As a result, a uniformly dispersed mixture having a pigment concentration of 25.1% by mass was obtained.

The resultant mixture was transferred to a stainless drum, and 360 parts of ion-exchanged water and 180 parts of diethylene glycol were added thereto. The mixture was dispersed using a bead mill (Nano Mill NM-G-2L manufactured by ASADA IRON WORKS. CO., LTD.) at a temperature of 25° C. for a residence time of 1.67 minutes to obtain a water-based pigment dispersion liquid.

Subsequently, 2080 parts of the dispersion liquid was continuously subjected to centrifugation using a continuous centrifuge (H-6005 manufactured by KOKUSAN Co., Ltd., volume: 2 L) with a centrifugal force of 18900 G at a temperature of 35° C. for a residence time of 12 minutes to obtain a water-based pigment dispersion liquid having a pigment concentration of 15.2% by mass.

Furthermore, an inkjet recording ink having a pigment concentration of 4% by mass was produced using the obtained water-based pigment dispersion liquid and the components below.

Aqueous pigment dispersion liquid: 5.52 parts
2-Pyrrolidinone: 1.60 parts
Triethylene glycol monobutyl ether: 1.60 parts
Acetylene glycol surfactant, Surfynol 440 (manufactured by Nissin Chemical Industry Co., Ltd.): 0.10 parts
Glycerin: 0.60 parts
Ion-exchanged water: about 11 parts Example 2

A water-based pigment dispersion liquid was produced as in Example 1, except that the amount of Surfynol CT211 added was changed from 15 parts (3% of pigment) to 5 parts (1% of pigment). An inkjet recording ink having a pigment concentration of 4% by mass was prepared from the water-based pigment dispersion liquid as in Example 1.

Example 3

A water-based pigment dispersion liquid was produced as in Example 1, except that the amount of Surfynol CT211 added was changed from 15 parts to 30 parts (6% of pigment). An inkjet recording ink having a pigment concentration of 4% by mass was prepared from the water-based pigment dispersion liquid as in Example 1.

Example 4

A water-based pigment dispersion liquid was produced as in Example 1, except that the styrene-acrylic acid copolymer (A-2) having an acid value of 172 was used instead of the styrene-acrylic acid copolymer (A-1) having an acid value of 155 and the amount of 8N aqueous potassium hydroxide solution (solid content=34% by mass) was changed from 45.6 parts to 50.6 parts. An inkjet recording ink having a pigment concentration of 4% by mass was prepared from the water-based pigment dispersion liquid as in Example 1.

Example 5

A water-based pigment dispersion liquid was produced as in Example 1, except that Surfynol 440 was used instead of Surfynol CT211. An inkjet recording ink having a pigment concentration of 4% by mass was prepared from the water-based pigment dispersion liquid as in Example 1.

Example 6

A water-based pigment dispersion liquid was produced as in Example 1, except that the amount of styrene-acrylic acid copolymer (A-1) was changed from 100 parts to 150 parts. An inkjet recording ink having a pigment concentration of 4% by mass was prepared from the water-based pigment dispersion liquid as in Example 1.

Example 7

A water-based pigment dispersion liquid was produced as in Example 1, except that the amount of diethylene glycol was changed from 155 parts to 115 parts. An inkjet recording ink having a pigment concentration of 4% by mass was prepared from the water-based pigment dispersion liquid as in Example 1.

Example 8

A water-based pigment dispersion liquid was produced as in Example 1, except that the amount of diethylene glycol was changed from 155 parts to 140 parts. An inkjet recording ink having a pigment concentration of 4% by mass was prepared from the water-based pigment dispersion liquid as in Example 1.

Example 9

A water-based pigment dispersion liquid was produced as in Example 1, except that the amount of diethylene glycol was changed from 155 parts to 194 parts. An inkjet recording ink having a pigment concentration of 4% by mass was prepared from the water-based pigment dispersion liquid as in Example 1.

Example 10

A water-based pigment dispersion liquid was produced as in Example 1, except that Surfynol CT211 was changed to Surfynol CT111 in the same amount. An inkjet recording ink having a pigment concentration of 4% by mass was prepared from the water-based pigment dispersion liquid as in Example 1.

Comparative Example 1

A water-based pigment dispersion liquid was produced as in Example 1, except that 40 parts of dipropylene glycol was used instead of 15 parts of Surfynol CT211. An inkjet recording ink was prepared from the water-based pigment dispersion liquid as in Example 1.

Comparative Examples 2 to 6

A water-based pigment dispersion liquid was produced as in Example 1, except that, as shown in Table 1, 15 parts of Surfynol 104 (Comparative Example 2), 15 parts of Surfynol 420 (Comparative Example 3), 15 parts of Surfynol 465 (Comparative Example 4), 15 parts of Surfynol CT221 (Comparative Example 5), or 15 parts of Surfynol CT231 (Comparative Example 6) was used instead of 15 parts of Surfynol CT211 in Example 1. An inkjet recording ink having a pigment concentration of 4% was prepared from the water-based pigment dispersion liquid.

The compositions of Surfynol 104, Surfynol 420, Surfynol 465, Surfynol CT221, and Surfynol CT231 (each manufactured by Nissin Chemical Industry Co., Ltd.) are described below.

Surfynol 104 (1,4-diisobutyl-1,4-dimethylbutynediol, HLB=4)

Surfynol 420 (ethylene oxide (20 mass %) adduct of 1,4-diisobutyl-1,4-dimethylbutynediol, HLB=4)

Surfynol 465 (ethylene oxide (65 mass %) adduct of 1,4-diisobutyl-1,4-dimethylbutynediol, HLB=13)

Surfynol CT221 (mixture containing 20% by mass of 1,4-diisobutyl-1,4-dimethylbutynediol and 63% by mass of ether compound of secondary alcohol whose alkyl group has 11 to 15 carbon atoms and polyoxyethylene, HLB=13)

Surfynol CT231 (mixture containing 6% by mass of 1,4-diisobutyl-1,4-dimethylbutynediol and 33% by mass of ether compound of secondary alcohol whose alkyl group has 11 to 15 carbon atoms and polyoxyethylene, HLB=14)

Comparative Example 7

A water-based pigment dispersion liquid was produced as in Example 1, except that the styrene-acrylic acid copolymer (A-3) was used instead of the styrene-acrylic acid copolymer (A-1) and the amount of 8N aqueous potassium hydroxide solution (solid content=34% by mass) was changed from 45.6 parts to 35.6 parts. An inkjet recording ink having a pigment concentration of 4% by mass was prepared from the water-based pigment dispersion liquid as in Example 1.

Comparative Example 8

A water-based pigment dispersion liquid was produced as in Example 1, except that the styrene-acrylic acid copolymer (A-4) was used instead of the styrene-acrylic acid copolymer (A-1) and the amount of 8N aqueous potassium hydroxide solution (solid content=34% by mass) was changed from 45.6 parts to 39.7 parts. An inkjet recording ink having a pigment concentration of 4% by mass was prepared from the water-based pigment dispersion liquid as in Example 1.

Comparative Example 9

A water-based pigment dispersion liquid was produced as in Example 1, except that the styrene-acrylic acid copolymer (A-5) was used instead of the styrene-acrylic acid copolymer (A-1) and the amount of 8N aqueous potassium hydroxide solution (solid content=34% by mass) was changed from 45.6 parts to 54.1 parts. An inkjet recording ink having a pigment concentration of 4% by mass was prepared from the water-based pigment dispersion liquid as in Example 1.

Comparative Example 10

A water-based pigment dispersion liquid was produced as in Example 1, except that the amount of Surfynol CT211 added was changed from 15 parts (3% of pigment) to 45 parts (9% of pigment). An inkjet recording ink having a pigment concentration of 4% by mass was prepared from the water-based pigment dispersion liquid as in Example 1.

Comparative Example 11

A water-based pigment dispersion liquid was produced as in Example 1, except that Surfynol CT211 was not added in Example 1. An inkjet recording ink having a pigment concentration of 4% by mass was prepared from the water-based pigment dispersion liquid as in Example 1.

Reference Example 1

A water-based pigment dispersion liquid was produced as in Example 1, except that Pigment Yellow 185 was used instead of Pigment Yellow 155. An inkjet recording ink having a pigment concentration of 4% by mass was prepared from the water-based pigment dispersion liquid as in Example 1.

Reference Example 2

A water-based pigment dispersion liquid was produced as in Reference Example 1, except that the amount of Surfynol CT211 added was changed from 15 parts to 0 parts. An inkjet recording ink having a pigment concentration of 4% by mass was prepared from the water-based pigment dispersion liquid as in Reference Example 1.

The water-based pigment dispersion liquids and inkjet recording inks produced in Examples and Comparative Examples above were evaluated in accordance with the evaluation items and evaluation methods below.
<Evaluation of Dispersibility>
The particle size of dispersed particles, viscosity, and precipitation property of each of the obtained water-based pigment dispersion liquids were measured to evaluate dispersibility and long-term dispersion stability.
<Measurement of Particle Size and Viscosity>
After each of the water-based pigment dispersion liquids produced in Examples and Comparative Examples was diluted 1000 times, the particle size of dispersed particles in the water-based pigment dispersion liquid was measured with "Microtrac UPA150" (manufactured by Leeds & Northrup Company). Herein, the volume-average particle size of dispersed particles was measured as the particle size of dispersed particles in the water-based pigment dispersion liquid.

The viscosity was measured at 25° C. using an E-type viscometer (TVE-20L manufactured by Tokimec, Inc.).
<Measurement of Precipitation Property>
The precipitation property was evaluated as follows. Each of the inkjet inks having a pigment concentration of 4% by mass and produced in Examples and Comparative Examples was stored in a 10 mL glass vial at 25° C. for 2 weeks. The vial was turned upside down after the storage and precipitation onto the bottom was observed through visual inspection. In this method that can be used to measure precipitation property with high sensitivity, the evaluation was performed in accordance with the criteria below.
Precipitation property: large . . . When a glass vial is turned upside down, the attachment of pigment particles to a wall surface is significant.
Precipitation property: medium . . . When a glass vial is turned upside down, the attachment of pigment particles to a wall surface is recognized.
Precipitation property: small . . . When a glass vial is turned upside down, the attachment of pigment particles to a wall surface is hardly recognized.
<Evaluation of Inkjet Recording Ink>
<Evaluation of Gloss>
Each of the inkjet recording inks having a pigment concentration of 4% by mass and produced in Examples and Comparative Examples was provided to the black cartridge position of Inkjet Printer EM-930C (manufactured by SEIKO EPSON CORPORATION). Images having an image density of 50% and 95% were recorded on Premium Glossy Photo Paper (manufactured by SEIKO EPSON CORPORATION) as a recording medium 1. The gloss of the recorded images was measured as a gloss value at 20° using "Micro-TRI-Gloss" (manufactured by BYK-Gardner). Furthermore, the same evaluation was performed using Photo Gallery Glossy Paper (manufactured by Olympus Corporation) as a recording medium 2 to obtain a gloss value.

When the images having an image density of 50% and 95% on the recording medium 1 respectively have a gloss value of 30 or more and 60 or more, the inkjet recording ink is evaluated as good and can be practically used without any problem. When the image having an image density of 95% on the recording medium 1 has a gloss value of 70 or more, the inkjet recording ink is evaluated as excellent. When the images having an image density of 50% and 95% on the recording medium 2 respectively have a gloss value of 50 or more and 70 or more, the inkjet recording ink is evaluated as good and can be practically used without any problem. When the images having an image density of 50% and 95% on the recording medium 2 respectively have a gloss value of 60 or more and 75 or more, the inkjet recording ink is evaluated as excellent.
<Evaluation of Long-Term Dispersion Stability>
Each of the inkjet recording inks produced in Examples and Comparative Examples and used for the evaluation of gloss was left to stand at 70° C. for 8 weeks. A change in the volume-average particle size between before and after standing was measured and used as an indicator of stability. When an increase in the particle size is 8% or less, the inkjet recording ink is evaluated as good.

TABLE 1

| | Raw materials used and addition ratio | | | | | | Dispersibility | | |
| --- | --- | --- | --- | --- | --- | --- | --- | --- | --- |
| | Kneading aid used | HLB | Amount of surfactant (mass % relative to pigment) | Pigment used | Acid value of resin (mgKOH/g) | Amount of resin (mass % relative to pigment) | Solid content (mass %) | Volume-average particle size (nm) | Precipitation property (long-term vial test) | Viscosity (mPa s) |
| Ex. 1 | SF CT211 | 10 | 3 | PY 155 | 155 | 20 | 75.5 | 79 | Small | 2.9 |
| Ex. 2 | SF CT211 | 10 | 1 | PY 155 | 155 | 20 | 76.4 | 87 | Small | 3.1 |
| Ex. 3 | SF CT211 | 10 | 6 | PY 155 | 155 | 20 | 74.1 | 88 | Small | 3.2 |
| Ex. 4 | SF CT211 | 10 | 3 | PY 155 | 172 | 20 | 75.2 | 94 | Small | 3.2 |
| Ex. 5 | SF 440 | 8 | 3 | PY 155 | 155 | 20 | 75.5 | 102 | Small | 3.5 |
| Ex. 6 | SF CT211 | 10 | 3 | PY 155 | 155 | 30 | 76.9 | 85 | Small | 3.9 |

TABLE 1-continued

| | | | | | | | | | | |
|---|---|---|---|---|---|---|---|---|---|---|
| Ex. 7 | SF CT211 | 10 | 3 | PY 155 | 155 | 20 | 79.4 | 95 | Small | 3.4 |
| Ex. 8 | SF CT211 | 10 | 3 | PY 155 | 155 | 20 | 76.9 | 83 | Small | 3.1 |
| Ex. 9 | SF CT211 | 10 | 3 | PY 155 | 155 | 20 | 72.0 | 94 | Small | 3.4 |
| Ex. 10 | SF CT111 | 10 | 3 | PY 155 | 155 | 20 | 75.5 | 86 | Small | 3.2 |
| C.E. 1 | dipropylene glycol | — | 8 | PY 155 | 155 | 20 | 73.2 | 95 | Medium | 3.2 |
| C.E. 2 | SF 104 | 4 | 3 | PY 155 | 155 | 20 | 75.5 | 120 | Medium | 3.2 |
| C.E. 3 | SF 420 | 4 | 3 | PY 155 | 155 | 20 | 75.5 | 121 | Medium | 3.3 |
| C.E. 4 | SF 465 | 13 | 3 | PY 155 | 155 | 20 | 75.5 | 112 | Medium | 3.2 |
| C.E. 5 | SF CT221 | 14 | 3 | PY 155 | 155 | 20 | 75.5 | 125 | Medium | 3.2 |
| C.E. 6 | SF CT231 | 14 | 3 | PY 155 | 155 | 20 | 75.5 | 137 | Medium | 3.3 |
| C.E. 7 | SF CT211 | 8 | 3 | PY 155 | 121 | 20 | 76.0 | 154 | Large | 3.1 |
| C.E. 8 | SF CT211 | 8 | 3 | PY 155 | 135 | 20 | 75.8 | 138 | Large | 3.1 |
| C.E. 9 | SF CT211 | 8 | 3 | PY 155 | 184 | 20 | 75.0 | 99 | Medium | 3.5 |
| C.E. 10 | SF CT211 | 8 | 9 | PY 155 | 155 | 20 | 72.6 | 102 | Medium | 3.1 |
| C.E. 11 | none | | 0 | PY 155 | 155 | 20 | 76.9 | 116 | Large | 4.0 |
| R.E. 1 | SF CT211 | 8 | 3 | PY 185 | 155 | 20 | 75.5 | 202 | Large | 5.2 |
| R.E. 2 | none | — | 0 | PY 185 | 155 | 20 | 76.9 | 190 | Large | 4.8 |

| | Long-term dispersion stability: increase in particle size at 70 C. for 8 weeks | Gloss | | | |
|---|---|---|---|---|---|
| | | Recording medium 1 50% | Recording medium 1 95% | Recording medium 2 50% | Recording medium 2 95% |
| Ex. 1 | 2% | 33 | 72 | 65 | 81 |
| Ex. 2 | 3% | 32 | 70 | 62 | 78 |
| Ex. 3 | 4% | 32 | 71 | 63 | 77 |
| Ex. 4 | 7% | 33 | 70 | 61 | 77 |
| Ex. 5 | 1% | 32 | 71 | 60 | 75 |
| Ex. 6 | 5% | 33 | 71 | 60 | 75 |
| Ex. 7 | 2% | 33 | 72 | 64 | 79 |
| Ex. 8 | 3% | 33 | 73 | 64 | 81 |
| Ex. 9 | 2% | 32 | 70 | 61 | 77 |
| Ex. 10 | 4% | 32 | 70 | 64 | 77 |
| C.E. 1 | 4% | 26 | 66 | 51 | 75 |
| C.E. 2 | 2% | 25 | 65 | 55 | 74 |
| C.E. 3 | 2% | 25 | 66 | 55 | 74 |
| C.E. 4 | 5% | 24 | 65 | 52 | 70 |
| C.E. 5 | 3% | 23 | 64 | 54 | 74 |
| C.E. 6 | 3% | 24 | 64 | 55 | 72 |
| C.E. 7 | 1% | 20 | 45 | 41 | 54 |
| C.E. 8 | 3% | 22 | 47 | 42 | 59 |
| C.E. 9 | 24% | 27 | 52 | 44 | 69 |
| C.E. 10 | 2% | 26 | 62 | 42 | 75 |
| C.E. 11 | 3% | 20 | 50 | 42 | 72 |
| R.E. 1 | 5% | 18 | 21 | 34 | 30 |
| R.E. 2 | 4% | 17 | 23 | 36 | 31 |

Ex.: Example
C.E.: Comparative Example
R.E.: Reference Example

As is clear from Table 1, the water-based pigment dispersion liquids in Examples 1 to 10 have a small volume-average particle size and good precipitation property in the vial test. In the inkjet recording inks produced from the water-based pigment dispersion liquids, the particle size does not increase even after the long-term storage at 70° C. When an image is formed using each of the inks, higher gloss is achieved compared with gloss in Comparative Examples.

If acetylene glycol surfactants whose HLB value is outside the range of 8 to 12 are used, the amount of precipitation increases in the vial test and gloss degrades (Comparative Examples 2 to 6). The range of the acid value of the styrene-acrylic acid copolymer (b) (Comparative Examples 7 to 9) and the range of the mass ratio (e)/(a) of the kneading aid (e) to the bis-acetoacetallylide pigment (Comparative Examples 10 and 11) specified are important. It is clear that, if such ranges are outside the ranges specified, the amount of precipitation increases and gloss degrades.

Furthermore, an effect of the kneading aid (e) on C.I. Pigment Yellow 185 was confirmed. However, even if kneading is performed with the kneading aid (e), a decrease in the amount of precipitation or an increase in gloss was not confirmed. It was found that the effect of the kneading aid (e) was produced on only limited pigments such as C.I. Pigment Yellow 155 (Reference Examples 1 and 2).

It was confirmed that the inkjet recording inks described in Examples and Comparative Examples had good jettability in preparing full-page printed samples for gloss measurement.

The water-based pigment dispersion liquid obtained by dispersing the pigment composition in a water-based medium is used as a main component of inkjet recording ink. The inkjet recording ink contains a significantly small number of coarse particles and has excellent dispersion stability, and a high-gloss image can be formed using the ink.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

The invention claimed is:

1. A pigment composition, produced by the process of:
kneading a mixture containing a bis-acetoacetallylide pigment (a), a styrene-acrylic acid copolymer (b), a basic compound (c), a humectant (d), and a kneading aid (e), wherein the kneading aid (e) comprises
a surfactant composed of a compound represented by general formula (1)

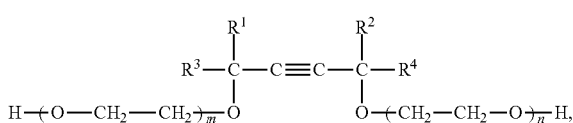

(1)

and/or
a surfactant composed of a mixture comprising
a compound represented by general formula (2)

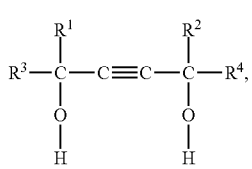

(2)

a polyoxyethylene alkyl ether whose alkyl group has 12 to 14 carbon atoms, and/or
an ether compound represented by general formula (3)

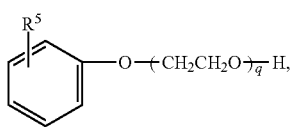

(3)

wherein the kneading aid (e) has a hydrophile-lipophile balance (HLB) value of 8 to 12,
wherein the mass ratio (e)/(a) of the kneading aid (e) to the bis-acetoacetallylide pigment (a) is 0.5/100 to 7/100,
wherein the acid value of the styrene-acrylic acid copolymer (b) is 145 to 175,
wherein, in formula (1), R1, R2, R3 and R4 each independently represent a linear or branched alkyl group having 1 to 8 carbon atoms in its main chain, and m and n each independently represent an integer of 0 to 20 and do not represent 0 at the same time,
wherein, in formula (2), R1, R2, R3 and R4 each independently represent a linear or branched alkyl group having 1 to 8 carbon atoms in its main chain,
wherein, in formula (3), q represents an integer of 1 to 30 and R5 represents a linear or branched alkyl group having 7 to 11 carbon atoms, and
wherein said pigment composition is in a solid form at room temperature.

2. The pigment composition according to claim 1, wherein, in formula (1), R1, R2, R3 and R4 each independently represent a linear or branched alkyl group having 1 to 4 carbon atoms in its main chain, and m and n each independently represent an integer of 0 to 10 and do not represent 0 at the same time.

3. The pigment composition according to claim 2, wherein, in formula (1), R1 and R2 each represent a methyl group, R3 and R4 each represent an isobutyl group, and m and n each independently represent an integer of 0 to 6 and do not represent 0 at the same time.

4. The pigment composition according to claim 1, wherein the kneading aid (e) comprises the surfactant composed of the mixture comprising
the compound represented by the general formula (2),
the polyoxyethylene alkyl ether, and/or
the ether compound represented by the general formula (3).

5. The pigment composition according to claim 4, wherein the polyoxyethylene alkyl ether is an ether of polyoxyethylene and a secondary alcohol whose alkyl group has 12 to 14 carbon atoms.

6. The pigment composition according to claim 5,
wherein the polyoxyethylene alkyl ether is a compound represented by general formula (4)

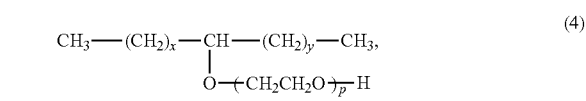

(4)

wherein, in formula (4), x+y is a positive integer of 9 to 11 and p represents an integer of 2 to 30.

7. The pigment composition according to claim 4, wherein the compound represented by the general formula (3) is polyoxyethylene nonylphenyl ether.

8. The pigment composition according to claim 1, wherein the bis-acetoacetallylide pigment (a) is C.I. Pigment Yellow 155.

9. The pigment composition according to claim 1, wherein the mass ratio (b)/(a) of the styrene-acrylic acid copolymer (b) to the bis-acetoacetallylide pigment is 10/100 to 40/100, and the mass ratio (d)/(a) of the humectant (d) to the bis-acetoacetallylide pigment (a) is 16/100 to 35/100.

10. The pigment composition according to claim 1, wherein the pigment composition has a solid content of 70 to 90% by mass.

11. A water-based pigment dispersion liquid produced by the process of:
dispersing the pigment composition according to any one of claims 1 to 10 in a water-based medium.

12. An inkjet recording ink, comprising:
the water-based pigment dispersion liquid according to claim 11 as a main component.

13. A method for producing a water-based pigment dispersion liquid, the method comprising:
kneading a mixture containing a bis-acetoacetallylide pigment (a), a styrene-acrylic acid copolymer (b), a basic compound (c), a humectant (d), and a kneading aid (e) to prepare a pigment composition which is in a solid form at room temperature; and
dispersing the pigment composition in a water-based medium, wherein the kneading aid (e) comprises
a surfactant composed of a compound represented by general formula (1)

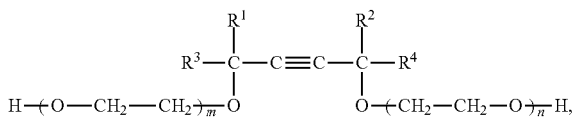
(1)

and/or
a surfactant composed of a mixture comprising
a compound represented by general formula (2)

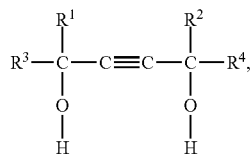
(2)

a polyoxyethylene alkyl ether whose alkyl group has 12 to 14 carbon atoms, and/or
an ether compound represented by general formula (3)

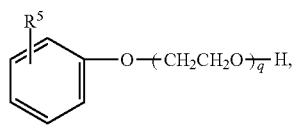
(3)

wherein the kneading aid (e) has a hydrophile-lipophile balance (HLB) value of 8 to 12, wherein the mass ratio (e)/(a) of the kneading aid (e) to the bis-acetoacetallylide pigment (a) is 0.5/100 to 7/100, wherein the acid value of the styrene-acrylic acid copolymer (b) is 145 to 175, wherein, in formula (1), R1, R2, R3 and R4 each independently represent a linear or branched alkyl group having 1 to 8 carbon atoms in its main chain, and m and n each independently represent an integer of 0 to 20 and do not represent 0 at the same time, wherein, in formula (2), R1, R2, R3 and R4 each independently represent a linear or branched alkyl group having 1 to 8 carbon atoms in its main chain, and wherein, in formula (3), q represents an integer of 1 to 30 and R5 represents a linear or branched alkyl group having 7 to 11 carbon atoms.

14. The method for producing a water-based pigment dispersion liquid according to claim 13, wherein the kneading aid (e) comprises the surfactant composed of the mixture comprising the compound represented by the general formula (2), and
the polyoxyethylene alkyl ether, and/or
the compound represented by the general formula (3).

15. The method for producing a water-based pigment dispersion liquid according to claim 13 or 14, wherein the bis-acetoacetallylide pigment is C.I. Pigment Yellow 155.

16. The method for producing a water-based pigment dispersion liquid according to claim 13 or 14, wherein, in the kneading step, the mass ratio (b)/(a) of the styrene-acrylic acid copolymer (b) to the bis-acetoacetallylide pigment (a) is 10/100 to 40/100, and the mass ratio (d)/(a) of the humectant (d) to the bis-acetoacetallylide pigment (a) is 16/100 to 35/100.

17. The method for producing a water-based pigment dispersion liquid according to claim 13 or 14, wherein the pigment composition has a solid content of 70 to 90% by mass.

18. An inkjet recording ink, comprising:
a water-based pigment dispersion liquid produced by the method for producing a water-based pigment dispersion liquid according to claim 13 or 14 as a main component.

* * * * *